(No Model.)
G. W. TUCKER.
SEED DRILL.
No. 534,305. Patented Feb. 19, 1895.
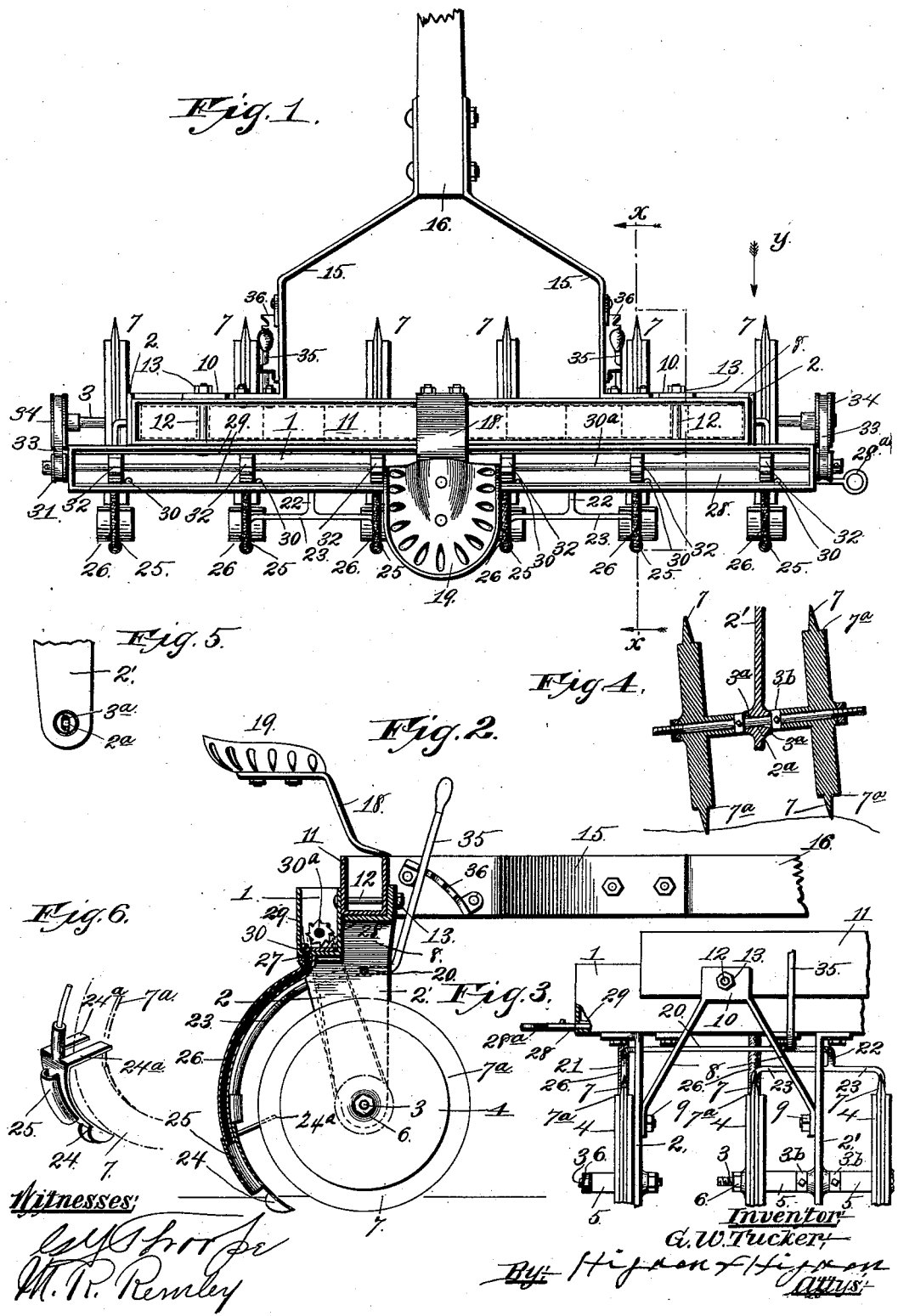

UNITED STATES PATENT OFFICE.

GEORGE W. TUCKER, OF MOBERLY, MISSOURI.

SEED-DRILL.

SPECIFICATION forming part of Letters Patent No. 534,305, dated February 19, 1895.

Application filed February 26, 1894. Serial No. 501,472. (No model.)

*To all whom it may concern:*

Be it known that I, GEORGE W. TUCKER, of Moberly, Randolph county, State of Missouri, have invented certain new and useful Improvements in a Combined Seed-Drill and Planter, of which the following is a full, clear, and exact description, reference being had to the accompanying drawings, forming a part hereof.

My invention relates to combined seed drills and planters, and has for its object to produce a machine of this character which may be adjusted to plant the seed at an equal depth in high, low or rough ground, and which is simple and inexpensive of construction.

Other objects of the invention will hereinafter appear, and be pointed out particularly in the claim.

In the accompanying drawings which illustrate the invention: Figure 1. is a top plan view of the machine. Fig. 2. is a vertical sectional view taken on the line $x$—$x$ of Fig. 1. Fig. 3. is a view of a portion of the machine, and is viewed in the direction indicated by the arrow $y$, Fig. 1. Fig. 4. is a vertical sectional view of a pair of cutter-rollers, and showing them adjustably mounted in their bearing. Fig. 5. is a side elevation of a portion of the said bearing. Fig. 6. is a perspective view of one of the shovels.

In the said drawings, 1 designates the seed-planter, and bolted to the under side of the same and depending vertically therefrom, are a number of plates 2—2', and the plates 2' are formed at their lower ends with bearings $2^a$, in which are revolubly mounted the shafts 3. There are preferably four bearing plates, and a corresponding number of shafts 3, and mounted revolubly upon the shafts 3, carried by the two outermost or end bearing-plates 2, are wheels or disks 4, and these wheels or disks 4 are provided with a sleeve 5 so as to give said disks an extended bearing upon the shafts, and these disks are secured from accidental displacement upon said shaft by the nuts 6, which engage the threaded ends of the shafts 3. The shafts 3 carried by the bearing-plates 2', find a bearing about midway of their length, and in order to allow said shafts to rock in a vertical plane, the bearing $2^a$ of the plates 2' is flared or enlarged vertically, as shown at $3^a$. This construction, it will be seen, allows the shaft to rock in a vertical plane, but prevents any pivotal or rocking movement in a horizontal plane. In order that these shafts may be secured from longitudinal movement in their bearings, sleeves or collars $3^b$, are secured thereon by set-screws or other suitable means, and bear against the opposite sides of the bearings. A disk similar in construction to the disks referred to, is mounted revolubly upon each end of the said shafts, and a sleeve extension 5 thereof, bears against the outer side of the adjacent collar $3^b$. Nuts 6 are now screwed upon the opposite ends of the shafts, and bear against the outer sides of the said disks. These disks are provided peripherally with an annular cutting-flange 7, which is approximately V-shape in cross section, and this annular flange projects from the disk in such manner that an annular shoulder $7^a$, is formed at each side of its inner end. This shoulder limits the depth of cut or drill made in the earth by the flange 7, when the disks are in operation.

From the foregoing, it will be apparent that in passing over rough or uneven ground, the inner disks, or those carried upon each end of the rocking-shaft, will adapt themselves to the uneven surface of the ground, as shown in Fig. 4.

A bearing bracket, comprising the upwardly converging bars 8, is bolted at its lower end, as at 9, to each pair of adjacent bearing-plates 2—2', and is formed at its upper end with the vertical ear or extension 10, which bears against the front side of a hopper 11, supported upon the upper end of the bearing-brackets 8.

To prevent the accidental displacement of the hopper 11 from position between the ears or extensions 10, and the front side of the hopper 1, the bolts 12 are passed horizontally through the front wall of the hopper 1, the ears or extensions 10, and the vertical walls of the interposed hopper 11, and the projecting ends of said bolts are engaged by retaining nuts 13.

Secured to the front side of the hopper 11, by bolts or other suitable means, and extending divergently forward therefrom in a horizontal plane, are the arms 15, and bolted between said arms in the usual manner, is the tongue 16 of the machine. Securely bolted to the front side of the hopper 11, about midway its length, and rising rearwardly and upwardly therefrom, is the supporting-plate 18, and secured upon the upper end of said plate in the usual manner, is the seat 19.

A rock-shaft 20, is journaled horizontally and a suitable distance below the hopper 11, in each pair of adjacent bearing-plates 2—2', and the interposed arms of the bracket 8, and these rock-shafts are formed at their outer ends with a depending arm 21, which curves rearwardly and concentrically to the axis of the shaft 3, and lies in the same vertical plane and a suitable distance from the cutting-flange 7, of the adjacent end disk. The inner end of each rock-shaft 20, at a point above the space between the pair of disks carried by each rock-shaft 3, also extends rearwardly and downwardly at 22, and is formed with or has secured thereto, the branch-arms 23; which extend first laterally and are then curved concentrically to the axes of the shafts 3, and in rear of their respective cutting-disks.

Carried at the lower end of the arms 21 and 23 are the shovels 24, which are adapted each to open up the cut or drill made by its preceding cutting-disk, and these shovels are formed with scraper arms 24ª, engaging the cutting flange of the disks and at their rear sides with a passage-way 25, the open lower end of which is immediately in the rear of the shovel point. Communicating with the open upper end of each passage-way 25, is the lower end of a flexible tube 26, and each tube 26 communicates at its upper end with an opening 27 formed through the bottom of the seed-hopper 1.

A slide plate 28 rests upon the bottom of the hopper, and is retained in position by the longitudinal flanges or ribs 29, which bear upon its upper side. This slide plate 28, is provided with openings or holes 30, corresponding in number to and adapted to register with the openings 27, of the bottom of the hopper, so as to allow the seed to pass into the flexible tubes 26, when desired. This slide-plate 28, is provided with the handle 28ª, by which it is grasped when reciprocated.

Journaled longitudinally through the seed-hopper 1, is a shaft 30ª, and mounted upon the opposite ends of the said shaft are belt pulleys 31. Mounted rigidly upon said shaft also are a number of toothed wheels 32; there being one of these wheels opposite each hole or opening 27, in the bottom of the hopper, and these toothed wheels are designed in operation to evenly feed or push the grain in the direction of the said openings; thus constantly agitating the grain in the hopper and insuring a continual feed of the grain through the flexible spouts or tubes 26. Endless belts 33 operatively connect the belt pulleys 31, with the belt wheels 34, mounted upon the outer end of the outermost or end shafts 3. If desired, a sprocket wheel and chain connection may be substituted for these belts and pulleys. If desired, also, the hopper 1, may be formed in two parts; each part being provided with its end shaft 30ª, and these shafts 30ª being actuated independently of each other from their respective and adjacent end-shafts 3.

Secured to each rock-shaft in any suitable manner, and curving forwardly and upwardly therefrom at the front side of the hopper 11, is a lever 35, and these levers 35, being within convenient reach of the driver upon the seat, are adapted to engage one or the other of the notches in the segmental rack-bars 36, which are secured to the outer sides of the arms 15 carrying the tongue. By the manipulation of these levers, it will be seen, the shovels supported from each rock-bar may be adjusted to the desired depth, or may be raised entirely out of the ground when driving to or from the field, or when the machine is not in operation.

From the foregoing description, it will be seen that I have produced, by means of the V-shaped cutting-flange of the disks and the shovels following in their wake, practically a double cut in which the grain is dropped from the passage 25. It will also be seen, by mounting the shafts 3, carrying each a pair of cutting-disks, so that they shall rock in a vertical plane, that these cutting-disks will adjust themselves to the irregularities in the surface of the ground, so that a uniform depth of cut is obtained. If these cutting-disks are rigidly secured in the same horizontal plane, it is apparent that in passing over rough or uneven ground one would cut or form a deeper drill than its companion disk, carried by the same shaft. By means of the set-screws and collars, the disks may be adjusted also to form the drills nearer together or farther apart as desired.

In order to determine the depth of cut desired, down to a certain limit represented by the shoulders 7ª of the disk, the hopper 11 is adapted to receive weights represented by dotted lines in the drawings, or any suitable heavy substance may be used in lieu thereof. By applying more or less weight to the machine in this manner, the depth of drill may be determined.

Having thus described my invention, what I claim as new, and desire to secure by Letters Patent, is—

In a combined seed drill and planter, the combination with a hopper, of a number of bearing plates secured to and depending from said hopper, shafts journaled therein, disks mounted upon said shafts, a rock-shaft 20 journaled in said bearing plates and provided with downwardly projecting arms 23, shovels carried at the lower ends of said arms and in rear of said disks, a toothed segment 36 carried by the machine, a lever 35 projecting upward from the rock-shaft and engaging the toothed segment, a bracket comprising the downwardly divergent arms 8, which are secured at their lower ends to the bearing plates, and a weight receptacle supported upon said bracket, substantially as set forth.

In testimony whereof I affix my signature in presence of two witnesses.

GEORGE W. TUCKER.

Witnesses:
 S. D. CORNEAU,
 JOHN BAUR.